March 12, 1957     I. F. SMALCHUCK     2,784,613
GEAR
Filed Oct. 7, 1954
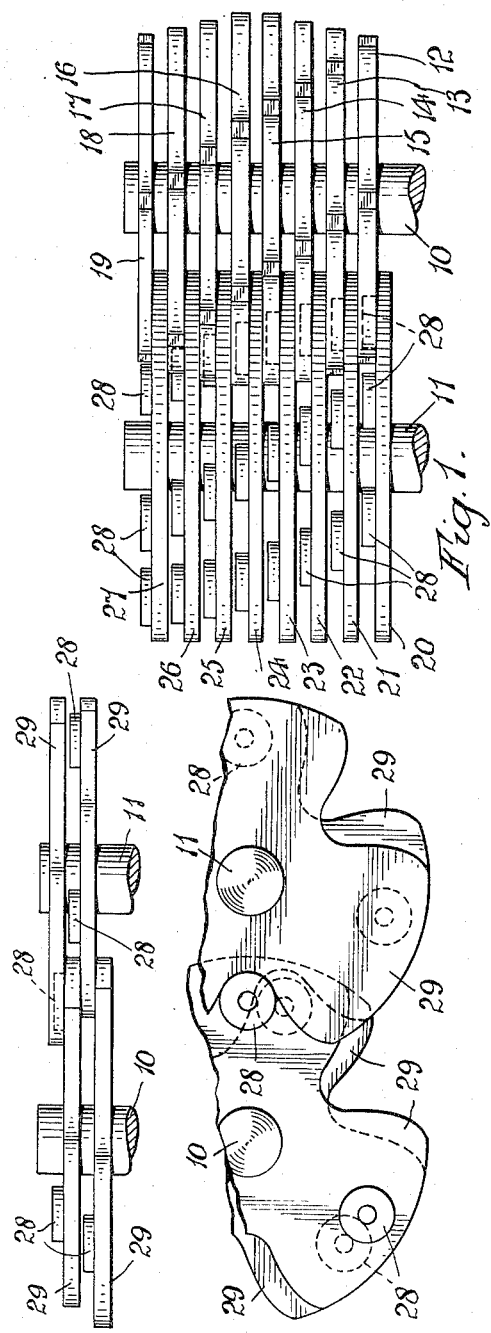
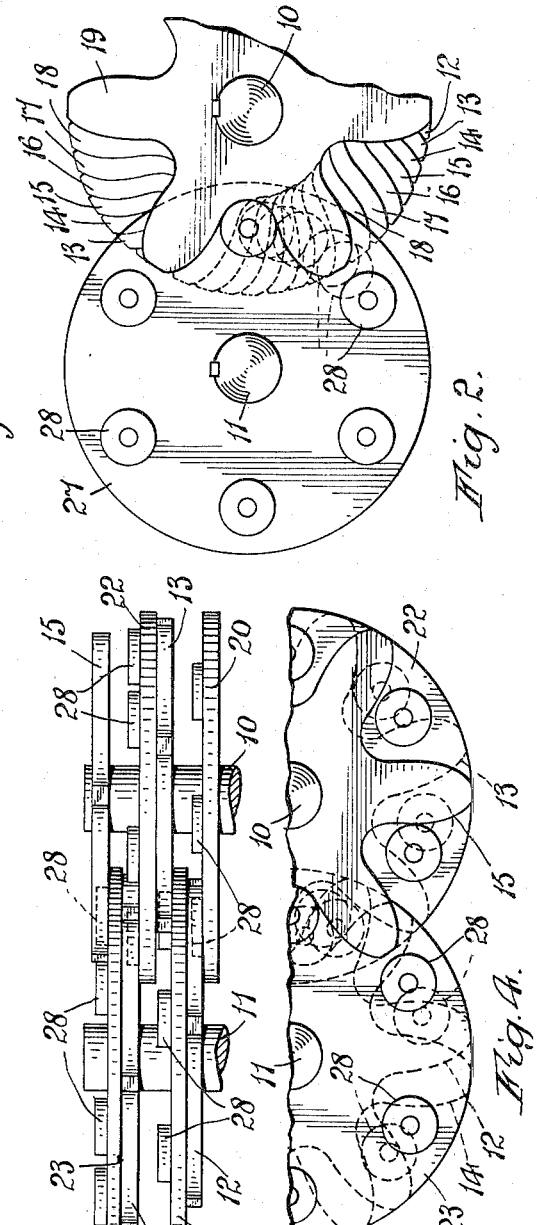
INVENTOR.
Ignaty F. Smalchuck

United States Patent Office 2,784,613
Patented Mar. 12, 1957

2,784,613

GEAR

Ignaty F. Smalchuck, Detroit, Mich.

Application October 7, 1954, Serial No. 460,938

3 Claims. (Cl. 74—415)

This invention relates to power transmitting means in the form of gearing and more particularly to gearing transmitting rotary motion from one to another pair of parallel shafts; and comprises the arrangement of a gang of gears fixed on one shaft arranged to mesh with a corresponding gang of gears on a second shaft, wherein the teeth of the gears of one gang are circularly offset relative to each adjacent gear of that gang in the order of divisions of the gear pitch whereby the gears of one gang may progressively mesh with the gears of the second gang.

More particularly, the said invention contemplates a pair of gangs of gears fixed upon parallel shafts with each gear of one gang being arranged each to mesh with an opposite gear of the second gang; each of the gears of one gang being circularly offset at an angle equal to the gear pitch divided by a successive number of gears in the gang relative to the next succeeding gear in that gang.

Still further, the said invention contemplates that the gears of one of the said gangs be characterized by having conventional teeth formed thereon while the gears of the other of said gangs be in the form of plates provided with means on said plates (preferably in the form of rollers) adapted to mesh with the teeth of the gears of the first mentioned gang.

Still further, the said invention contemplates that the gears of one gang may be alternately of a conventional toothed and of a plate formation, with the toothed gears of one gang meshing with means, such as rollers, provided on the alternating plates of the other gang.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a plan view of a gearing arrangement embodying the said invention;

Figure 2 is a partial end elevation of the same;

Figure 3 is a partial plan view of a modified form of the said arrangement;

Figure 4 is a partial end view of the same;

Figure 5 is a similar view to Figure 3 of a further modified arrangement; and

Figure 6 is a partial end view of the same.

Referring first to the Figures 1 and 2 of the drawings, 10 and 11 indicate a pair of parallel shafts, the first shaft 10 being shown as having a gang of gears 12, 13, 14, 15, 16, 17, 18 and 19 arranged thereon and keyed or otherwise affixed thereto; each of these said gears 12 to 19 being shown, as an example, as being of a six-lobed form although they may have any other reasonable number of teeth according to particular desire or requirement.

The teeth of the gang of gears on this shaft are not arranged in alignment along the shaft but, on the contrary, each of the gears constituting the gang is keyed or secured in a position of slight rotation relative to its adjacent gear and the teeth of the several gears being set at positions of progressive rotation along the shaft throughout the entire gang of gears. In other words, the teeth of each of the gears in the gang are circularly offset relative to the teeth of the next preceding gear to an angle equal to the pitch of the teeth divided by the number of gears in the gang.

Still referring to Figures 1 and 2, the second shaft 11 is shown as having a gang of gears secured thereon in similar number to those mounted on the first shaft, these gears being shown as in the form of plates 20, 21, 22, 23, 24, 25, 26 and 27 which are provided with teeth in the form of cylindrical studs or rollers 28 adapted to mesh with the spaces between the teeth of the gears mounted upon the first shaft 10, the gears of the said first shaft 10 being, in this case, spaced apart sufficiently to permit the plates 21 to 27 to pass therebetween, as will be obvious, in order that the said studs 28 may properly be engaged by the teeth of the first gang of gears.

Similar progressive circular offsetting of the rollers of this second set of plates or gears is resorted to as obtains with the teeth of the first mentioned gang of gears whereby to insure the progressive matching of each pair of gears throughout the two gangs.

The flanks of the teeth of the first gang of gears are of cycloidal or such conventional form such as will insure the most effective pressure angles of drive between the teeth of the first gang of gears and the studs 28 of the second gang, when rotation is imparted from the first mentioned gears to the second mentioned gears, as will be readily understood by those familiar with this art without futher detailed explanation.

It will be apparent that in the example illustrated in Figure 1, a complete set of plates and gears is shown to provide for all of the progressive circular offsetting which is possible in that particular arrangement without repetition; but still further plates and gears may be added to the shafts in either a further complete series, or a partial series, if thought necessary or desirable.

The arrangement shown in Figures 3 and 4 is similar to that already described, except that the plates 20, 21, 22 and gears 13, 14, 15 are alternately carried by the shafts 10 and 11. For instance, a plate 20 is shown as being carried by the shaft 10 while the corresponding gear 12 is carried by the shaft 11 as is the similar arrangement with the plate 22 and gear 14. Likewise the plates 21 and 23 are carried by the shaft 11 and their matching gears 13 and 15 by the shaft 10. The progressive circular offsetting of the gears and of the rollers is maintained as in the first example and for the same purpose.

In the arrangement shown in Figure 3, the gears of both shafts are all alike but of a modified form as compared to the gears previously described inasmuch as they each are shown as of a three-lobed character, due to the elimination of each alternate tooth spacing to provide a lobe of such a width that all of the said gears 29 may be provided with a stud or roller 28 on each of its lobes to mesh with the tooth spacing between the lobes of the adjacent gear 29, as clearly shown in Figure 6. Here again, the progressive circular offsetting of the tooth spaces and the rollers throughout the series of gears on each shaft is resorted to, to effect the progressive transmission of power through each successive pair of gears in the manner already described.

This invention may be developed within the scope of the following claims without departing from the essential features of the said invention, and it is desired that the specification and drawing be read as being merely illustrative of a practical embodiment of the same and not in strictly limiting sense.

What I claim is:

1. In a power transmitting means, the combination comprising a pair of parallel shafts, a gang of equal sized gears, having teeth formed thereon, fixed to one of said shafts, the teeth of each of said gears being circularly offset relative to the teeth on the next succeeding gear an angle equal to the pitch of the gear teeth divided by the number of gears, each of said gears being spaced from one another along the axis of said one shaft, plates fixed on the other of said shafts with each plate adapted to interfit within the space between two opposing gears on said one shaft, each of said plates carrying a number of studs equal to the number of teeth of one of said gears, with said studs on each of said plates being equally spaced circularly about the axis of said second shaft, the studs on each of said plates being arranged to mesh with the teeth of one of said gears, whereby said plates and gears are progressively intermeshed when the shafts are rotated.

2. In a power transmitting means as defined in claim 1 above, wherein each of said plates is circularly offset relative to the next succeeding plate an angle equal to the angle of offset of said gear teeth.

3. In a power transmitting means as defined in claim 1 above, wherein a roller is mounted upon each of said studs and said gear teeth faces are cycloidal in form.

References Cited in the file of this patent

UNITED STATES PATENTS

| | | |
|---|---|---|
| 1,141,097 | Alquist | June 1, 1915 |
| 1,166,402 | Farquhar | Dec. 28, 1915 |
| 1,326,706 | Alquist | Dec. 30, 1919 |
| 2,349,022 | Ungar | May 16, 1944 |